March 10, 1953  H. J. HORN  2,631,066
VEHICLE WHEEL COVER

Filed June 23, 1948  2 SHEETS—SHEET 1

Inventor
HARRY J. HORN
By Barnes, Kisselle, Laughlin & Raisch
Attorneys.

March 10, 1953 H. J. HORN 2,631,066
VEHICLE WHEEL COVER

Filed June 23, 1948 2 SHEETS—SHEET 2

INVENTOR.
HARRY J. HORN
BY
Barnes, Kisselle, Laughlin & Raisch
ATTORNEYS

Patented Mar. 10, 1953

2,631,066

UNITED STATES PATENT OFFICE 2,631,066

VEHICLE WHEEL COVER

Harry J. Horn, Lansing, Mich., assignor to Motor Wheel Corporation, Lansing, Mich., a corporation of Michigan Application June 23, 1948, Serial No. 34,616

3 Claims. (Cl. 301—37)

This invention relates to a vehicle wheel cover.

It is old in the art to detachably mount a cover on a vehicle wheel. Since the wheel cover covers the bolts or cap screws which secure the wheel to the hub, it is necessary that the cover be detachable. The prior art is replete with snap-on type wheel covers. One of the disadvantages of detachable wheel covers now in use is that they are readily and frequently lost by disengaging themselves from the wheel during usage, particularly when the vehicle is rolling over a rough or bumpy road. Another disadvantage of the currently used snap-on type wheel cover is the expense involved in the fabrication of the spring clips which interengage the cover and in the mounting of these clips on the wheel.

This invention contemplates a detachable wheel cover which can be readily snapped into interengagement with the wheel but which will not be disengaged from the wheel by pounding or vibration such as occurs when the vehicle is rolling over rough and bumpy highway.

The invention also contemplates a detachable cover which will not be accidentally disengaged from the wheel but which can be very easily disengaged from the wheel by the application of the proper tool, such as a screw-driver, to the securing means.

It is also an object of this invention to produce a wheel cover which is effectively and securely interengaged with the wheel and which is relatively less expensive to fabricate and attach to the wheel than wheel covers presently in use.

Figure 2:
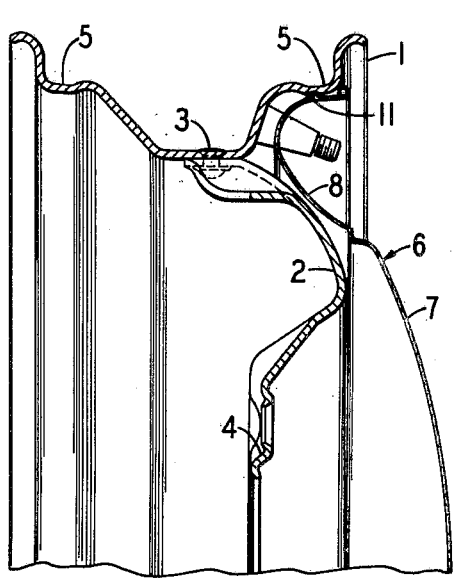
Fig. 2 is a section along the line 2—2 of Fig. 1.
Figure 1:
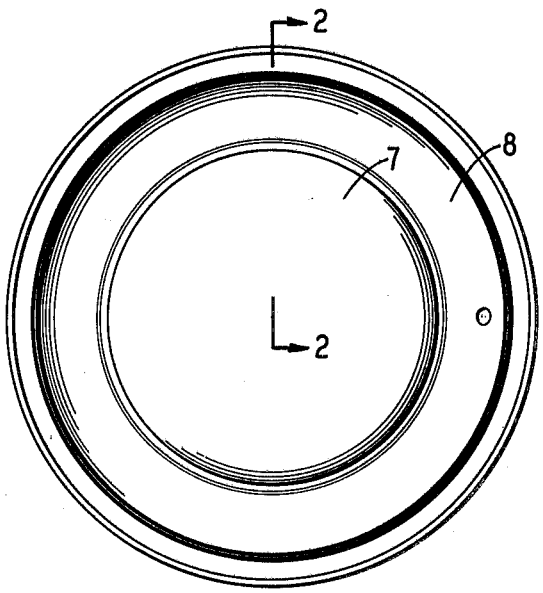
Fig. 1 is a side elevation showing my cover attached to the rim of a disc type vehicle wheel.
Figure 3:
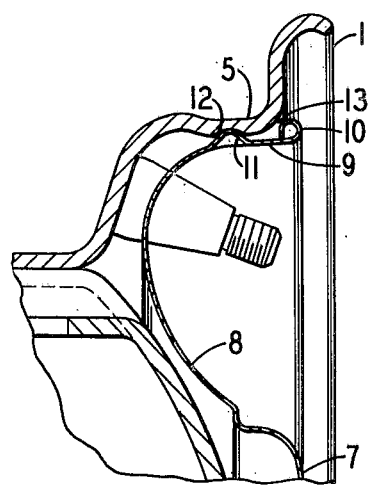
Fig. 3 is an enlarged scale showing of a portion of Fig. 2.

Referring more particularly to the drawings there is shown a vehicle wheel comprising a rim 1, a wheel body 2 which is secured to the rim by rivets 3. The bolting-on flange of the wheel body is designated 4. Rim 1 is a conventional rim provided with seats 5 for the beads of the rubber tire which is mounted on the wheel.

My cover, generally designated 6, is made from an inherently resilient thin material, preferably sheet metal, and comprises a sheet metal stamping having a central area 7 which is dished axially outwardly or to the right, Fig. 2, and an outer circumferential portion 8 which is dished inwardly or in the reverse direction from central portion 7. The outer circumferential portion 9 extends generally axially of the wheel and may, with respect to the inner circumferential portion of area 8 and central portion 7 of the cover, be referred to as an outwardly return bent circumferential area. The cover 6 terminates in a peripheral bead 10. It should be noted that return bent portion 9 and bead 10 do not contact rim 1 and also that cover 6 does not contact the wheel body and rim except through bubbles or humps 11 which are pressed radially outwardly from cover portion 9.

Cover 6 is provided with at least three bubbles 11 which are spaced peripherally equidistant about the circumference of the cover. For each bubble 11 seat portion 5 of rim 1 is provided on its radially inner face with a socket 12 which snugly interengages the outer portion of a hump 11. The interengagement of humps 11 with sockets 12 provide a three point suspension for the cover on the rim and also prevent relative rotation between the rim and cover.

To assemble cover 6 to rim 1 it is only necessary to seat two humps 11 in two sockets 12 whereupon axially inward pressure applied to the cover will cause the third hump to ride over the inner face of seat portion 5 and into the remaining socket 12. When cover 6 is assembled to rim 1, the outer return bent portion 9 of cover 6 will be somewhat distorted radially inwardly so that portion 9, being under tension, urges bubbles 11 into resilient interengagement with notches 12.

To remove the cover a tool, such as a screw-driver, is inserted between bead 10 and the rim, preferably adjacent a hump 11, and bead 10 at this point is forced radially inwardly thereby radially disengaging one hump 11 from its socket 12 which thereby permits the cover to be drawn axially outwardly and lifted off the rim. It should be noted that there is a slight clearance 13 between the bead and the rim which facilitates the insertion of an instrument, such as a screw-driver, between the bead and the rim to remove the cover.

Figure 4:
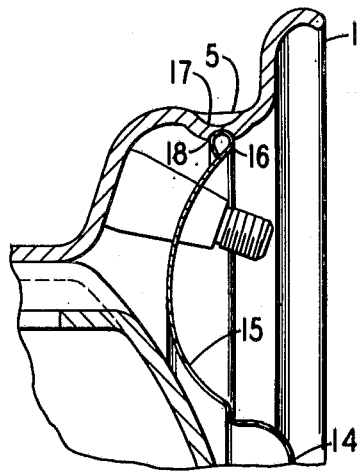
Fig. 4 is a radial sectional view similar to Fig. 2 of a modified cover.
Figure 5:
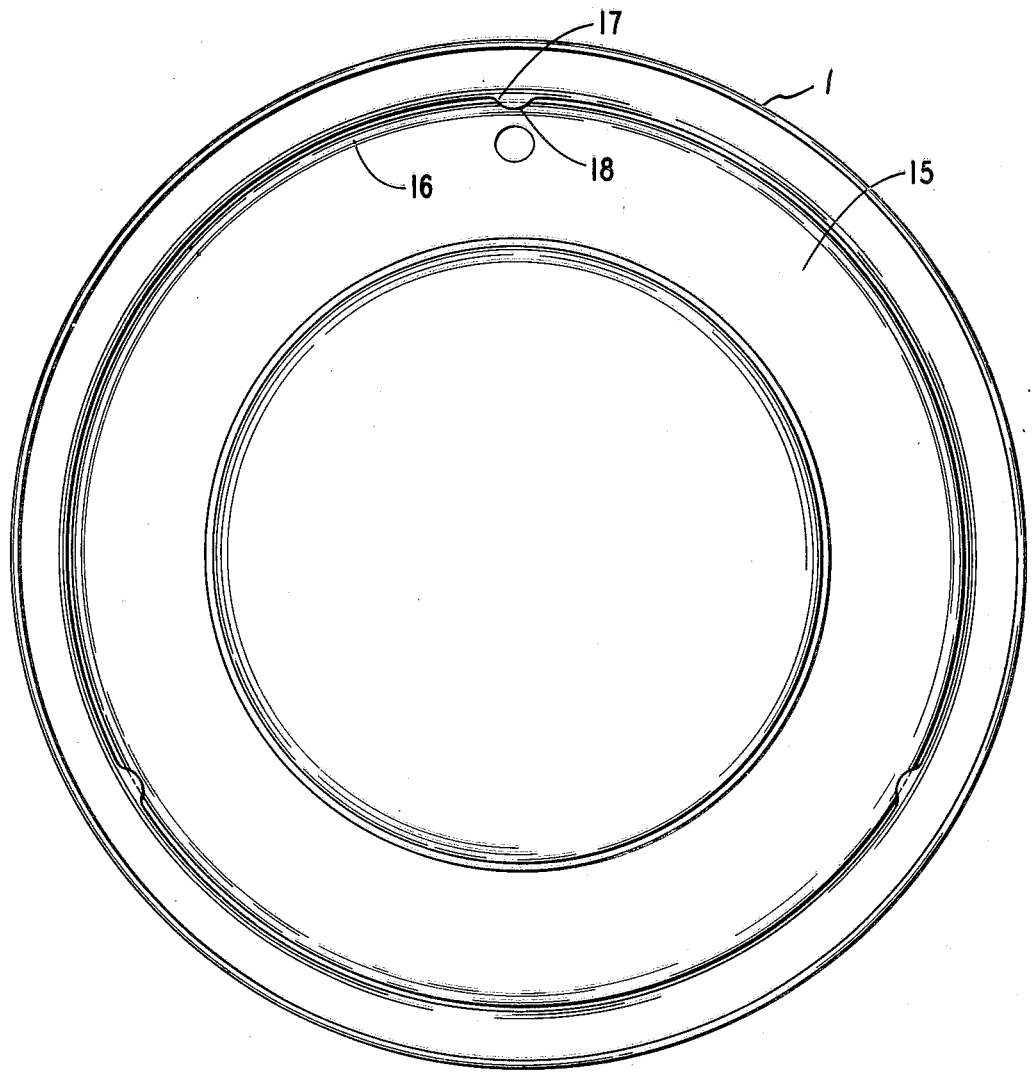
Fig. 5 is a side elevation of the modification partially shown in Fig. 4 and this figure shows my modified cover attached to the rim of a disc type vehicle wheel.

In the form shown in Fig. 4, the cover is provided with a central portion 14 which is outwardly dished and an outer circumferential portion 15 which is inwardly dished. The cover is provided with a bead 16 around its outer circumference. Seat portion 5 of rim 1 is provided with at least three radially inward indentations or bubbles 17, the inner faces of which are provided with notches 18 in which the beaded edge 16 of the cover interengages. Rim 1 will have at least three embossments or bubbles 17 which are preferably equidistantly spaced about the inner circumference of seat portion 5. Thus, there will be a slight clearance between bead 16 and the rim 1 between bubbles 17.

The modified form of cover is easily installed upon the wheel by inserting bead 16 in two sockets 18 and then pressing the edge of the cover adjacent the third bubble 17 axially inwardly until the bead 16 snaps into the remaining or third socket 18. Bead 16 will be distorted slightly inwardly at each bubble 17 so that the inherent resilience of the cover will at all times urge bead 16 outwardly into interengagement with notches 18.

The cover is easily removed from the wheel by inserting an instrument, such as a screw-driver, in the clearance between bead 16 and the rim and preferably adjacent one of the bubbles 17 whereupon with a slight prying action bead 16 will be disengaged from one of the sockets 18 which at the same time permits the cover to be lifted from the rim. Thus, when the cover is mounted on the wheel its only point of contact with either the rim or wheel body is at the three points of interengagement between bead 16 and sockets 18.

I claim:

1. The combination with the rim member of a vehicle wheel, of an inherently resilient sheet metal cover member having an annular bead extending circumferentially of said cover and forming a radially outwardly extending shoulder on said cover, said cover having at least three points of suspension on said rim, said points of suspension being spaced circumferentially of said annular bead and constituting the sole points of contact between the wheel and the cover, each point of suspension comprising a radial inward projection on said rim member provided with a radially inwardly opening groove engaging said annular bead, said grooves and said annular bead defining a circle of smaller diameter than the portion of the rim member provided with said projections whereby said annular bead is spaced from the rim member between said projections.

2. The combination with a rim member of a vehicle wheel, of an inherently resilient cover member provided with a circumferential edge portion having at least three points of suspension on said rim, said points of suspension being spaced circumferentially of said circumferential edge portion and constituting the sole points of contact between the wheel and cover, said circumferential edge portion comprising an annular bead and defining the circumference of said cover, each point of suspension comprising a radial inward projection on said rim member provided with a radially inwardly opening groove engaging said annular bead, said grooves and said annular bead defining a circle of smaller diameter than the portion of the rim member provided with said projections whereby said annular bead is spaced from the rim member between said projections and a clearance is provided between the portion of said rim provided with said projections and said annular bead which facilitates the removal of the cover from the rim by inserting a tool between the rim and said annular bead.

3. The combination as claimed in claim 2 wherein said bead extends continuously around the circumferential edge of said cover.

HARRY J. HORN.

REFERENCES CITED

The following references are of record in the file of this patent:

UNITED STATES PATENTS

| Number | Name | Date |
|---|---|---|
| 2,098,205 | Eksergian | Nov. 2, 1937 |
| 2,239,898 | Lyon | Apr. 29, 1941 |
| 2,308,616 | Lyon | Jan. 19, 1943 |
| 2,368,228 | Lyon | Jan. 30, 1945 |
| 2,404,389 | Lyon | July 23, 1946 |
| 2,445,330 | Lyon | July 20, 1948 |